(12) United States Patent
Vennam

(10) Patent No.: US 11,354,483 B1
(45) Date of Patent: Jun. 7, 2022

(54) PARASITIC REPRESENTATION OF LARGE SCALE IC PACKAGES AND BOARDS

(71) Applicant: ANSYS, Inc., Canonsburg, PA (US)

(72) Inventor: Prakash Vennam, Cupertino, CA (US)

(73) Assignee: ANSYS, INC., Canonsburg, PA (US)

( * ) Notice: Subject to any disclaimer, the term of this patent is extended or adjusted under 35 U.S.C. 154(b) by 0 days.

(21) Appl. No.: 17/142,381

(22) Filed: Jan. 6, 2021

(51) Int. Cl.
*G06F 30/398* (2020.01)
*G06F 30/367* (2020.01)
*G06F 30/392* (2020.01)

(52) U.S. Cl.
CPC .......... *G06F 30/398* (2020.01); *G06F 30/367* (2020.01); *G06F 30/392* (2020.01)

(58) Field of Classification Search
USPC ........................................................ 716/112
See application file for complete search history.

(56) References Cited

U.S. PATENT DOCUMENTS

| | | | |
|---|---|---|---|
| 10,762,259 B1* | 9/2020 | Ershov | G06F 30/30 |
| 2018/0260505 A1* | 9/2018 | James | G06F 13/4282 |
| 2019/0325100 A1* | 10/2019 | James | G06F 13/4282 |

* cited by examiner

*Primary Examiner* — Mohammed Alam
(74) *Attorney, Agent, or Firm* — Womble Bond Dickinson (US) LLP (57) ABSTRACT

Improved parasitic analysis of a design of an electrical circuit (e.g. a PCB coupled to an IC package) can use a first parasitic analysis to identify a first set of pins having excessive parasitic values ("hotspots" in the design) and then identify a second set of pins that do not have excessive parasitic values. The pins in the second set can be clustered (e.g. using a grid of cells) to reduce a model size for calculations in a second parasitic analysis, and the pins in the first set can be analyzed in the second parasitic analysis either individually or in clusters of similar pins with excessive parasitic values.

20 Claims, 6 Drawing Sheets

PARASITIC REPRESENTATION OF LARGE SCALE IC PACKAGES AND BOARDS

BACKGROUND

The field of this disclosure relates to simulations of circuit designs. In particular, this disclosure relates to simulations of integrated circuit (IC) packages that include circuit connections between an IC and one or more printed circuit boards attached to the IC.

As IC packaging and printed circuit board (PCB) technology continue to progress to smaller sizes and as ICs become more complex, the number of package pins and PCB traces, and the density of those pins and traces, have increased. As a result, finding weak design spots (e.g., excessive parasitic resistance and inductance at a pin due to excessively small or improperly routed conductive traces) involves extracting parasitic values (using finite element methods or other techniques) for thousands of pins, and this can take weeks to accomplish. This approach may not even be feasible due to turnaround time constraints on the design team.

SUMMARY OF THE DESCRIPTION

According to one embodiment, a method can preprocess a package and a printed circuit board, which are coupled to an integrated circuit, to derive hotspots (such as individual pins on the package that are coupled to the IC) for parasitic values and then cluster hotspots, if possible, and also cluster the remainder of the pins that are not hotspots (using for example a grid of pins). After the preprocessing, extraction of parasitic values by conventional approaches can be used on the reduced size model that results from the preprocessing. The individual hotspots and clusters of hotspots provide good precision for calculating parasitic values for the hotspots while the clusters of pins that are not hotspots provides a reduction of the complexity of the calculations so that the calculations are reduced while also retaining good precision overall because the hotspots are calculated with good precision. The hotspots can be clustered based on proximity to each other and based on having common nets.

In one embodiment, a method can include the following operations: performing a first parasitic analysis of a circuit design of a printed circuit board (PCB) coupled to an IC package to provide first extracted data about parasitic values of each pin in a set of pins on the PCB and IC package; determining, from the first extracted data, a first set of pins that have parasitic values that exceed a first parasitic value and determining a second set of pins that have parasitic values that do not exceed the first parasitic value; determining whether at least some pins in the first set of pins can be clustered; creating, in response to determining at least some pins in the first set of pins can be clustered, a first set of one or more clusters of pins, each cluster in the first set of one or more clusters having a plurality of pins from the first set of pins; creating a second set of one or more clusters of pins from the second set of pins; and performing a second parasitic analysis on the first set of pins and the second set of one or more clusters. In one embodiment, the first parasitic analysis can include at least one of (a) a first finite element method (FEM) analysis of the circuit design or (b) a first method of moments (MoM) analysis of the circuit design to derive the first extracted data. In one embodiment, the parasitic values are represented as one of: DC (direct current) resistance; or AC (alternating current) resistance and inductance; or IC (integrated circuit) pin level current.

In one embodiment, the second parasitic analysis can also include at least one of (a) a second FEM analysis of the first set of pins and the second set of one or more clusters or (b) a second MoM analysis of the first set of pins and the second set of one or more clusters.

In one embodiment, a first group of pins in the first set of pins are clustered into the first set of one or more clusters (e.g., clusters of hotspot pins) and a second group of one or more pins in the first set of pins are not clustered and are analyzed by the second parasitic analysis as an individual pins (e.g., individual hotspot pins). In one embodiment, the second parasitic analysis simulates a same excitation at a same voltage for each pin in a cluster of pins. In one embodiment when creating the first set of one or more clusters of pins, a pin, in the first set of pins, is clustered with other pins based on one or more of: (1) being coupled to a same net of conductors as the other pins; (2) having a parasitic value within a same range of parasitic values of the other pins; or (3) physical proximity to the other pins. In one embodiment, when creating the second set of one or more clusters of pins, a pin, in the second set of pins, is clustered with other pins, in the second set of pins, based on (1) being coupled to a same net of conductors as the other pins in the second set of pins; and (2) being located in a cell with the other pins in the second set of pins, the cell defined in a pattern of cells (such as a grid of cells) overlaid on the circuit design. In one embodiment, the pattern of cells can be displayed superimposed over the clusters to allow a designer to see how regions are cluster across a die of an IC; for example, in one embodiment, the first set of one or more clusters of pins and the second set of one or more clusters of pins can be displayed superimposed on a graphical representation of the circuit design.

In one embodiment, a method can further include the operation of: receiving a selection of a criteria used to determine the first set of pins, wherein the criteria includes one of: DC resistance; AC resistance and inductance; or IC pin level current parasitics. In one embodiment, the method can further include the operations of: calculating a statistical value from the first extracted data; adding a first threshold value to the statistical value to derive the first parasitic value; and comparing a parasitic value for each pin in the set of pins on the PCB and IC package to the first parasitic value to determine the first set of pins (e.g., the comparing includes a sorting operation that sorts the parasitic values for all pins in the set of pins on the PCB and IC package). In one embodiment, the method can further include the operation of: adjusting, after the comparing, the first parasitic value to reduce a number of pins in the first set of pins.

The aspects and embodiments described herein can include non-transitory machine-readable media that can store executable computer program instructions that when executed cause one or more data processing systems to perform the methods described herein when the computer program instructions are executed. The instructions can be stored in non-transitory machine-readable media such as in dynamic random access memory (DRAM) which is volatile memory or in nonvolatile memory, such as flash memory or other forms of memory. The aspects and embodiments described herein can also be in the form of data processing systems that are built or programmed to perform these methods. For example, a data processing system can be built with hardware logic to perform these methods or can be programmed with a computer program to perform these methods.

The above summary does not include an exhaustive list of all embodiments are aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
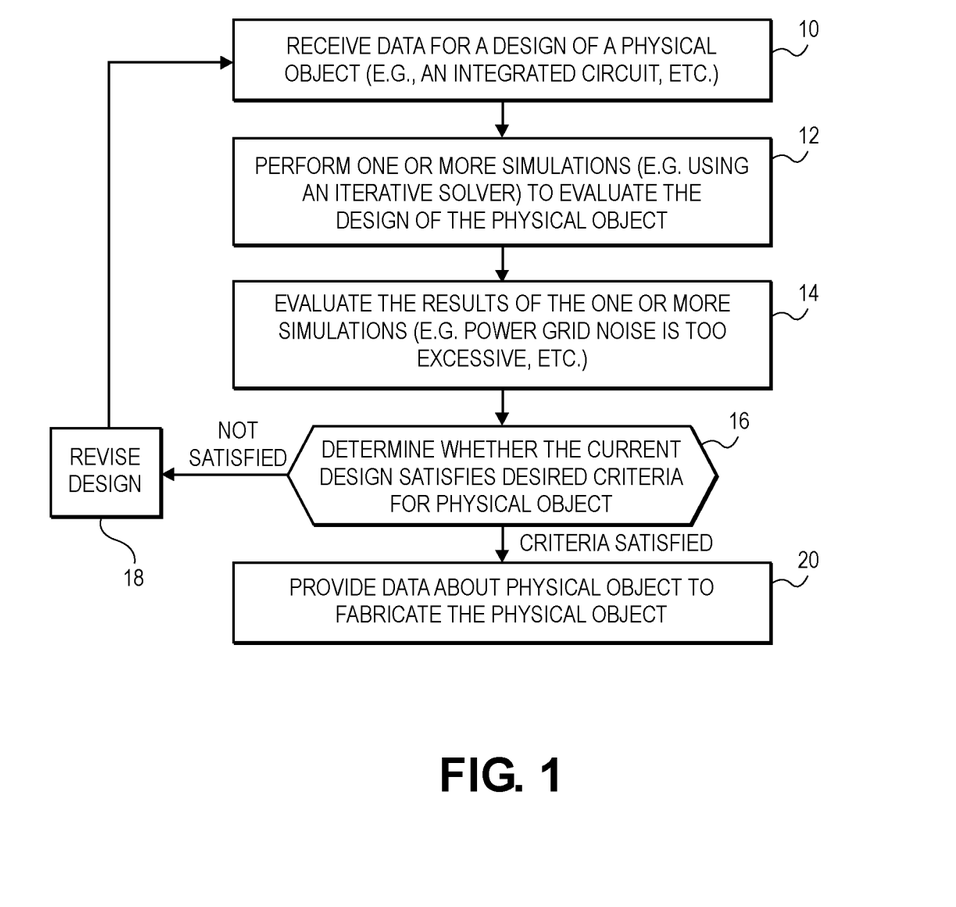
FIG. 1 is a flowchart which illustrates a method which can be used according to one or more embodiments described herein to design an integrated circuit (IC) package and PCB and simulate the operation of the system prior to fabricating the IC, the package and the PCB.

The embodiments described herein can be used in simulations of electrical circuits (for example, an IC package and PCB coupled to the IC package) in order to determine whether a particular design of the package and PCB satisfies particular requirements for the circuit or system containing the circuit. For example, there might be certain design requirements for a power distribution network in the IC package and PCB. FIG. 1 shows a method in which these design requirements can be tested relative to a particular design of an IC package and PCB coupled to the IC package or physical system which is being simulated. In operation 10 of FIG. 1, a data processing system (e.g., a computer executing simulation software to provide a simulation system) can receive data about a design for a particular IC package or other electrical circuit. The data can be created in CAD software on a data processing system, and the data can include information about the geometry of the package and PCB, pins and nets in the package and PCB, etc. Then in operation 12, the data processing system can perform one or more simulations (such as simulations based on physical models of the IC package and PCB) to evaluate the design of the IC by determining, for example, parasitic values for each pin on the IC package. These simulations can use the aspects and embodiments described herein. In one embodiment, the data processing system can perform simulations by using a solver which converges upon a solution that specifies parasitic values relative to pins on the IC package in the simulation. In operation 14, the designer can evaluate the results of one or more simulations to determine whether the design of the IC satisfies certain desired criteria for the design. This determination is shown in operation 16. If the one or more criteria is satisfied, then the designer in operation 20 can provide data about the circuit to allow the fabrication or manufacture of the IC package or system. For example, if the one or more criteria is satisfied, a CAD file can be produced that describes how to build the IC package or system. If the criteria are not satisfied as determined in operation 16, the designer can revise the design in operation 18 (for example, by changing sizes and/or quantity of the power distribution network in the IC package, etc.) and repeat the process by performing additional further simulations to evaluate the redesigned circuit. This can be repeated until the desired criteria are achieved for the circuit.

Figure 2A:
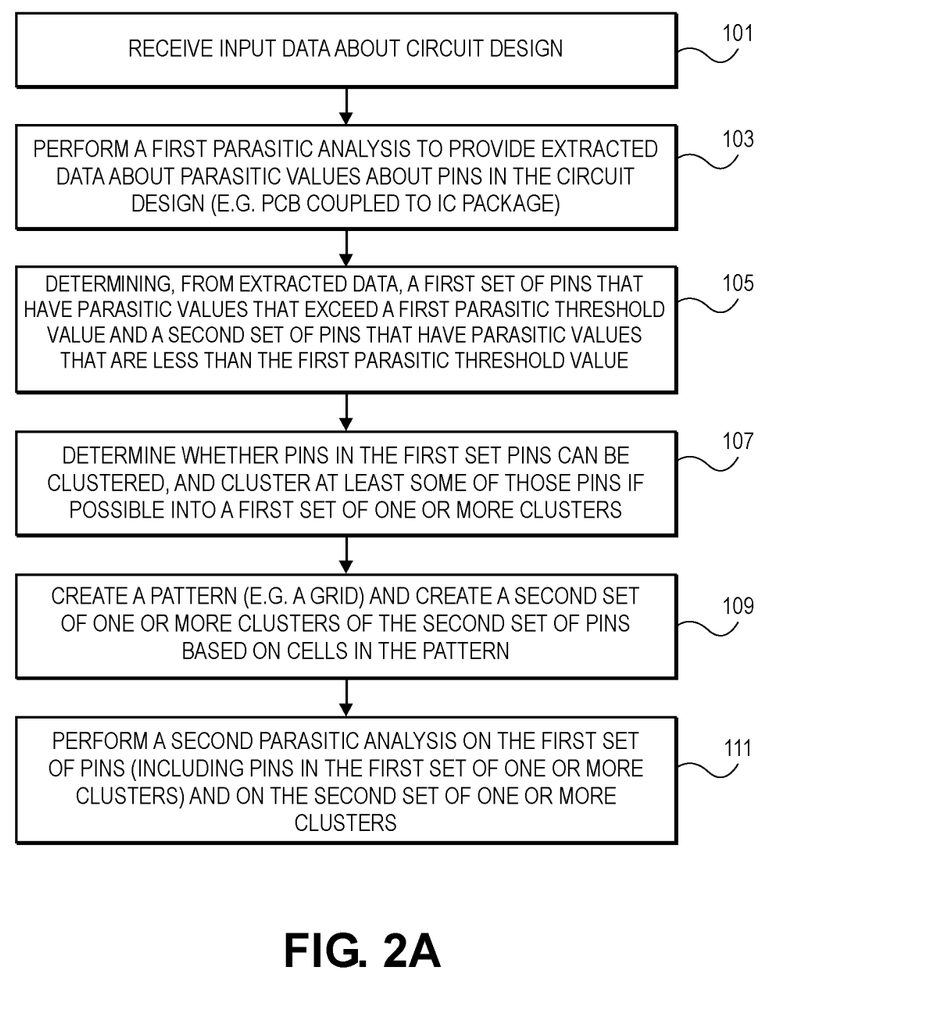
FIG. 2A is a flowchart that shows a method according to one embodiment that can simulate efficiently parasitic values of an IC package and PCB.

An example of a method according to one embodiment will now be described while referring to FIG. 2A. In operation 101 shown in FIG. 2A, a simulation system can receive input data about a circuit design such as an IC package and associated PCB. The IC package can be designed to hold and connect to an IC and also connect to a PCB; both the IC package and PCB include circuit traces or connections/conductors (often referred to as "nets") that electrically connect the IC to components outside of the IC. The IC package and the PCB can be any one of the known types of such packages (e.g., ball grid arrays, etc.) and PCBs. The input data, which is known in the art, can include the standard or known data types that describes a design of an IC package, such as data about the geometry of the design and pins of the package and nets in the IC package and PCB. The geometry data can include sufficient data about the size and layout of the nets so that conventional tools (e.g., FEM or MoM tools) can compute parasitic values for the nets in the design to provides parasitic values for the pins in the design. In one embodiment, the input data can also include data that is used in the embodiments described herein to control how the method shown in FIG. 2A is performed. In particular, the input data can also include (1) one or more threshold values which are described further below and (2) a user selection of a "hotspot" criteria to be used for the grouping or clustering operations described further below, and (3) an upper limit on the number of groups or clusters created in the method described further below and shown in FIG. 2A or 2B. The "hotspot" criteria that can be used for clustering or grouping can be any one of DC (direct current) resistance, AC (alternating current) resistance and inductance, or IC pin level currents. The selected "hotspot"

criterion is used when calculating the parasitic values and is used when deriving the first parasitic value described below. For example, if the selected hotspot criterion is DC resistance, then the calculated parasitic values for each pin are calculated and expressed in DC resistance, and the first parasitic value is calculated and expressed in DC resistance.

In operation 103 shown in FIG. 2A, a simulation system can perform a first parasitic analysis to provide extracted data about parasitic values of pins in the circuit design, such as pins on the IC package. In one embodiment, this first parasitic analysis performs an initial parasitic extraction of the physical structure of the IC package and PCB according to the selected or specified "hotspot" criterion. This first parasitic analysis can employ conventional techniques known in the art, such as the method shown in FIG. 2C, to extract the data about the parasitic values of the pins in the circuit design of the IC package and associated PCB.

Then in operation 105, the simulation system can determine, from the extracted data, a first set of pins (e.g., hotspot pins) that have parasitic values that exceed a first parasitic value and a second set of pins (e.g., uniform region pins) that have parasitic values that are less than the first parasitic value. In the example shown in FIG. 3A, pins 252A, 252B, 256, 258A, 258B, 254, and 261 are identified as pins having parasitic values that exceed the first parasitic value and are determined to be in the first set of pins. The first parasitic value can be a predetermined value that is set by a statistical analysis of the extracted data; for example, the statistical analysis can calculate a median or average parasitic value for all the pins in the design, and the median or average parasitic value can be used to set the first parasitic value. In one embodiment, the statistical analysis can calculate a median, and a threshold value can be added to the median to create the predetermined value for the first parasitic value (e.g., first parasitic value=calculated median+threshold value). In this way, the statistical analysis can determine "hotspots" (e.g., the first set of pins) for parasitic values which exceed the median by the threshold value, while the second set of pins can be pins that have parasitic values near the median value of the parasitic values (e.g., less than the median or less than the first parasitic value). In one embodiment, the first set of pins represents the hotspots for parasitic values while the second set of pens represents uniform regions of pins which have nearly uniform parasitic values that are not excessive. Initially, each pin within the first set of pins (once determined in operation 105) is placed in its own group or cluster prior to operation 107.

In operation 107, the simulation system determines whether each pin in the first set of pens can be clustered with other pins in the first set of pins. If they can be clustered, then at least some of the pins in the first set of pins are clustered into a first set of one or more clusters which represent in one embodiment clusters of hotspot pins, such as the cluster 265 (containing hotspot pins 252A and 252B) and the cluster 277 (containing hotspot pins 258A and 258B) shown in FIG. 3B which will be described further below. Operation 107 can use various criteria to determine whether or not to cluster pins in the first set of pins. For example, in one embodiment, hotspot pins (pins in the first set of pins) can be clustered together into a single cluster if their parasitic values are within a threshold difference value of each other and if they belong to the same net in the IC package. The clustering of hotspot pins can allow the simulation system to treat all of the pins in a particular cluster in the same way during simulations; for example, each of the hotspot pins within a particular cluster can receive the same simulated excitation at the same simulated voltage for each pin in the particular cluster during a simulation.

In operation 109, the simulation system can create a pattern of cells and create a second set of one or more clusters of the second set of pins based on the pattern of cells. In one embodiment, the pattern can be a grid that is used to assign each pin (within the second set of pins) to one of the cells based upon the location of the pin relative to the location of the cell on the layout of the IC package. The pattern of the grid can be superimposed on the pattern of the pins in the second set of pins, and the pins in the second set of pens which lie within the same cell in the pattern can be grouped together. Thus operation 109 represents a clustering of the rest of the pins that are not hotspot pins (in other words the second set of pins) into groups or clusters based upon their location on the grid, such as an M by N grid of cells. Within each cell of the grid, the pins can be grouped in one embodiment based upon whether or not they belong to the same net of the design. FIG. 3B shows an example of how operation 109 can create clusters based upon the grid of cells. For example, clusters 281, 283, and 285 and 287 are created from the repeating pattern of cells; in this example, each cluster (in the case of clusters 281, 283, and 285) contains six pins (in the second set of pins) defined by the boundary of the cell which matches the boundary of the cluster. In the case of cluster 287, pins 255A, 255B, 255C, 255D, and 255E are within the cluster defined by the cell in the upper right corner, but pin 254 is excluded from cluster 287 because it is in the first set of pins (pin 254 has a parasitic value that exceeds the first parasitic value in this example). In the example of FIG. 3B, the pattern of cells is arranged in four columns and three rows, and the first, third and fourth columns have cells that contain 3 pins (in the x direction) by 2 pins (in the y direction) while the second column has three cells that each contain 2 pins by 2 pins. The exact pattern can vary based on designer choice or simulation system preference. After operation 109, two sets of clusters (one set of clusters being clusters of hotspot pins and the other set of clusters being clusters on non-hotspot pins) will normally be created; the set of operations 103-109 can be considered a preprocessing operation that creates a reduced model (e.g., the two sets of clusters and any hotspot pins not in a cluster) for operation 111 that will calculate final parasitic values based on this reduced model.

In operation 111, the simulation system can perform a second parasitic analysis on the first set of pins (including pins in the first set of one or more clusters) and on the second set of one or more clusters to provide the final parasitic values for the design. This second parasitic analysis can employ conventional techniques known in the art, such as the method shown in FIG. 2C, to extract the data about the parasitic values of the pins in the circuit design of the IC package and associated PCB. However, the second parasitic analysis can use the two sets of clusters to reduce processing; for example, each of the hotspot pins within a particular cluster (in the first set of clusters) can receive the same simulated excitation at the same simulated voltage for each pin in the particular cluster during a simulation. Similarly, each pin in a cluster of non-hotspot pins (in the second set of clusters) can receive the same simulated excitation at the same simulated voltage. Individual hotspot pins (not in any clusters) can be processed individually for high levels of accuracy in deriving parasitic values. Once these parasitic values are calculated they can be examined by a designer. The simulation system can display data that focuses on the hotspot pins because the preprocessing has in effect highlighted those pins relative to the rest of the pins in the design. The method shown in FIG. 2A represents a simplified embodiment, and the method shown in FIG. 2B shows a more detailed embodiment.

Figure 2B:
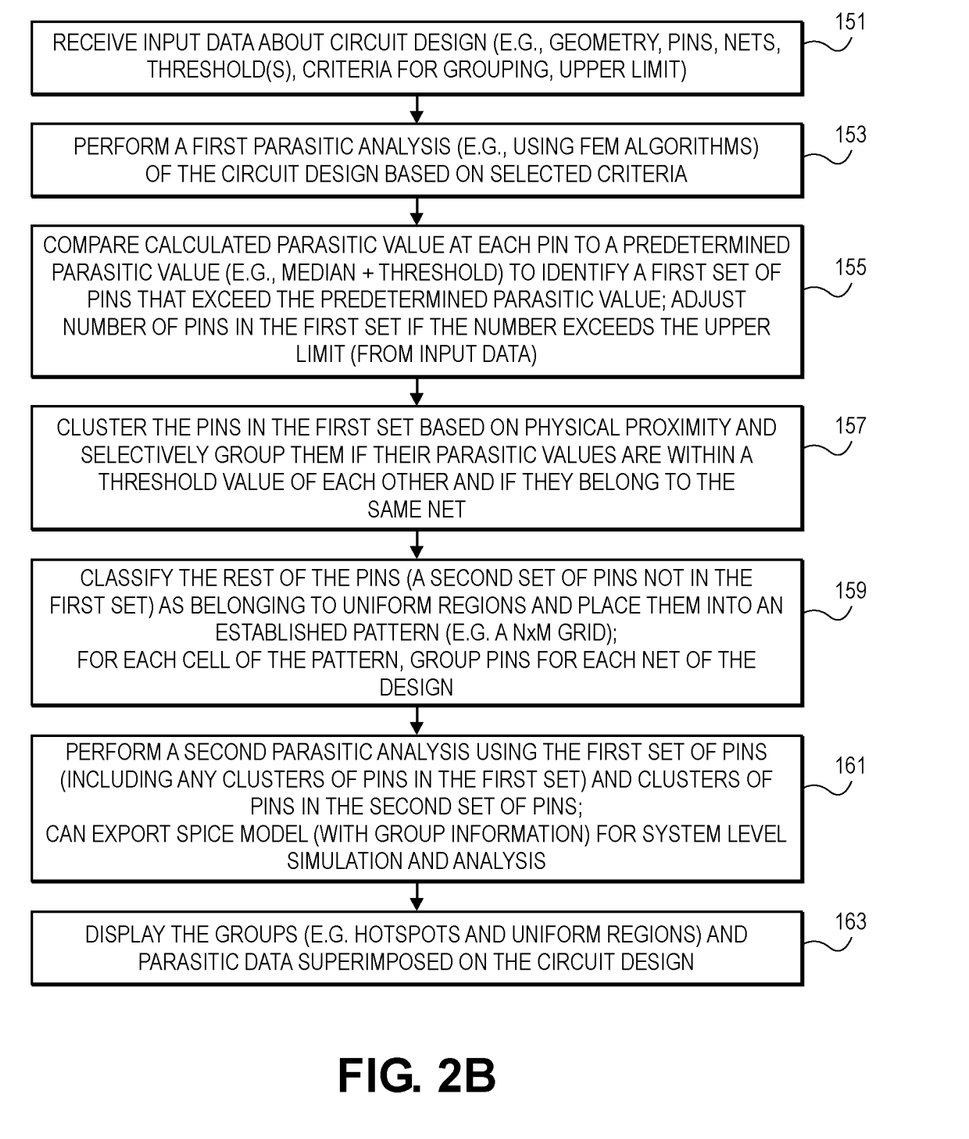
FIG. 2B is a flowchart that illustrates another method according to one embodiment that can simulate parasitic values of an IC package and PCB coupled to the IC.

Referring now to FIG. 2B, the method can begin in operation 151. In operation 151, the simulation system can receive input data about the circuit design. This input data can be the same as the conventional input data provided to a simulation system which calculates parasitic values, and this input data can include data about the geometry, pins, nets, and other data values known in the art that specify parameters about the design that can be used to calculate parasitic values of the design. Moreover, the input data can further include data that is used in the embodiments described herein. This further data can include threshold values, criteria for grouping, and an upper limit for the number of clusters or groups. This further data was described above in conjunction with the description of operation 101 in FIG. 2A.

In operation 153 in FIG. 2B, the simulation system can perform a first parasitic analysis using, for example, Finite Element Method algorithms that are known in the art to extract parasitic values about the pins in the circuit design based on the selected criteria which was selected in operation 151. For example, if the selected criteria was DC resistance, then the first parasitic analysis calculates parasitic values expressed in DC resistance. In operation 155, the simulation system compares the calculated parasitic value at each pin to a predetermined parasitic value (which can also be referred to as a predetermined parasitic threshold value) to identify a first set of pins that exceed the predetermined parasitic threshold value. In one embodiment, the predetermined parasitic threshold value can be based upon a statistical value, such as a median or average of all of the calculated parasitic values for all of the pins. Further, in one embodiment, the statistical value can be adjusted by adding a threshold value to the statistical value. In one embodiment, the threshold value can be specified by the designer in operation 151, and that threshold value is added to the calculated median (e.g., predetermined parasitic value=median+threshold value). In one embodiment, the calculated values can be sorted from highest to lowest to identify the first set of pins that exceed the predetermined parasitic value. In one embodiment, the system can adjust the number of pins in the first set of pins if the number of pins in the first set of pins exceeds an upper limit specified by the designer in operation 151. This adjustment can occur by adjusting the threshold value by increasing the threshold value. In effect, the threshold value can be an adjustable margin of how far the parasitic value must exceed the median or other statistical value (e.g., average) in order to characterize the parasitic value for pin as being excessive or a hotspot pin.

In operation 157, the simulation system can cluster the pins in the first set of pins based upon physical proximity to each other and can selectively group or cluster them if their parasitic values are within a threshold difference value of each other and if they belong to the same net on, for example, the IC package. Then the system in operation 159 can classify the rest of the pins as belonging to a second set of pins that are not part of the first set of pins. These second set of pins can be considered to belong to uniform regions that have parasitic values near the statistical value (e.g., the median calculated parasitic value). These second set of pins can then be clustered or grouped using an established pattern such as a grid of cells (e.g., M by N cells). In one embodiment, the pins within a cell can be grouped when they are coupled with the same net in the design in operation 159.

Figure 2C:
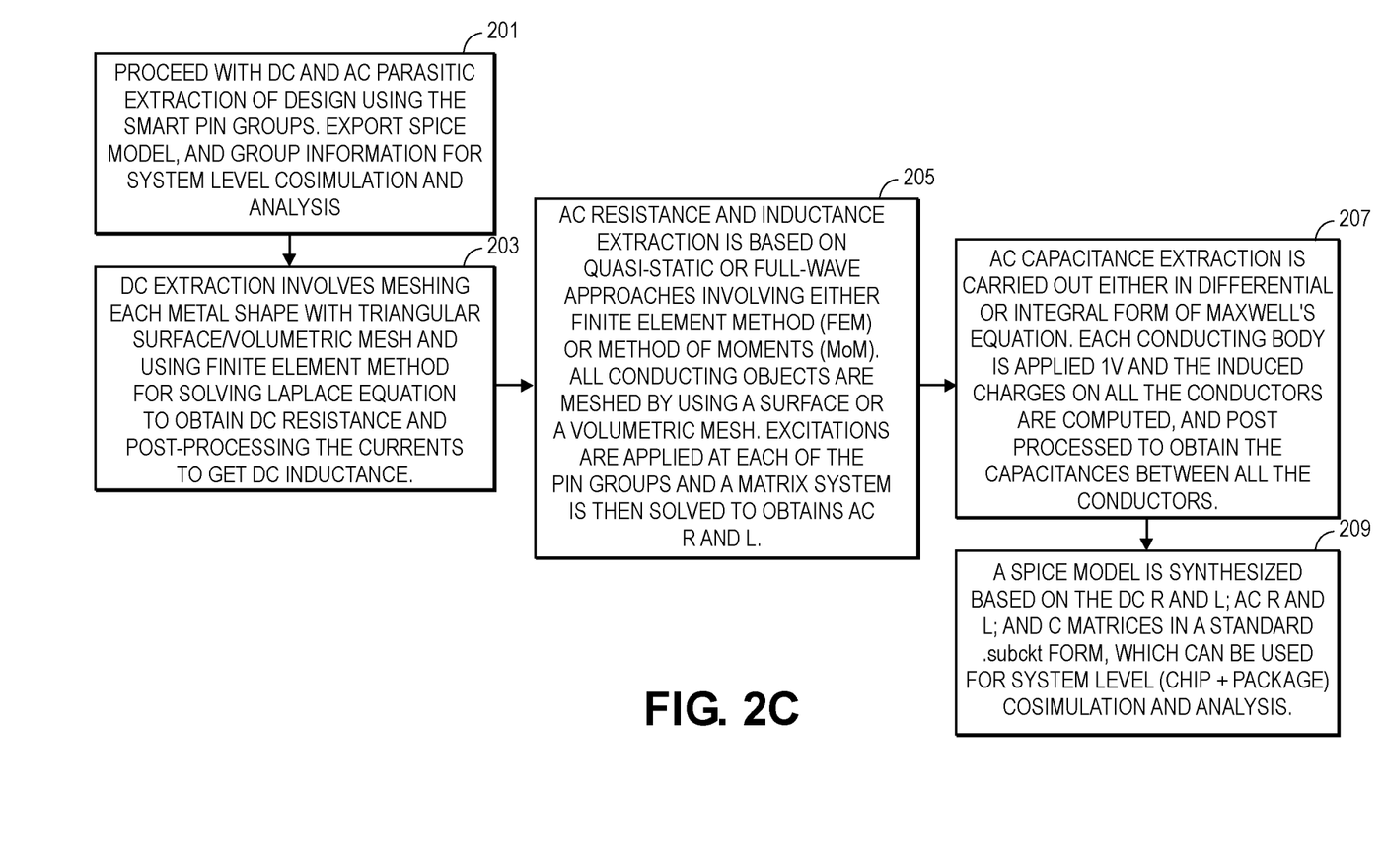
FIG. 2C shows a flowchart that depicts a method that can be performed as part of the method shown in FIG. 2B.
Figure 3A:
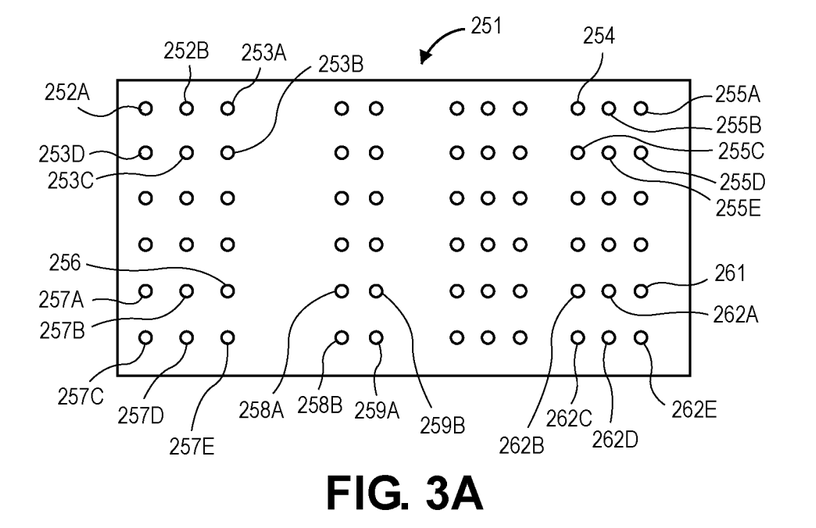
FIG. 3A illustrates a set of contact pins on an IC package or PCB, such as a ball grid array or similar package structure; circuit traces in the package or PCB are not shown but will be understood to be present.
Figure 3B:
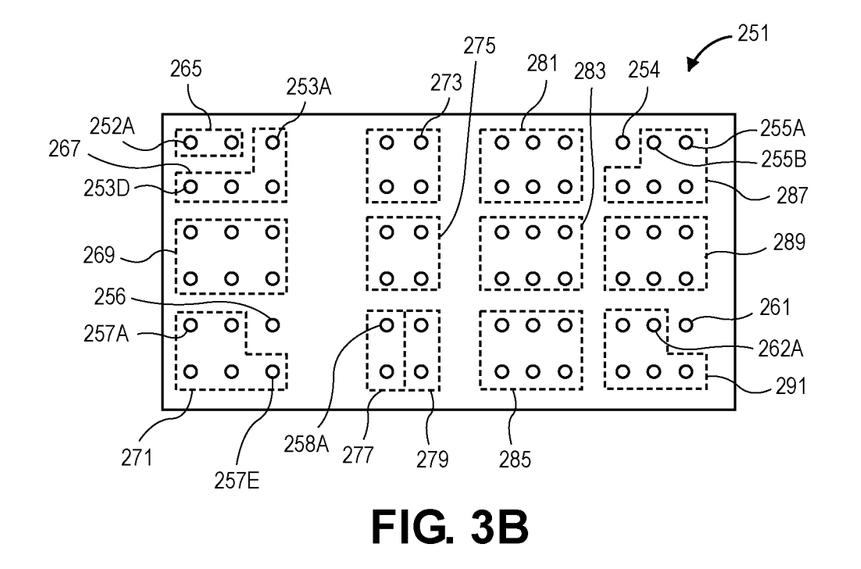
FIG. 3B shows the result of a method that detects, in a simulated IC package/PCB, hotspots (e.g., pins that exceed a threshold parasitic value) and can cluster those hotspots and also create clusters based on a grid.

The results of operations 157 and 159 in FIG. 2B can be seen in the examples shown in FIGS. 3A and 3B. FIGS. 3A and 3B show pins on an IC package 251. FIG. 3A represents the output after operation 155 in which the simulation system has identified certain pins as hotspot pins while the remainder of the pins have been characterized as pins within the second set of pins (non-hotspot pins). In the example shown in FIG. 3A, pins 252A, 252B, 256, 258A, 258B, 254, and 261 have been determined by the simulation system to be hotspot pins having parasitic values that exceed the predetermined parasitic value in operation 155. The remainder of the pins have been determined to be in the second set of pins, including pins 253A, 253B, 253C, 253D, 257A, 257B, 257C, 257D, 257E, 259A, 259B, 255A, 255B, 255C, 255D, 255E, 262A, 262B, 262C, 262D, and 262E. FIG. 3B represents the output after operation 159 in which the simulation system has identified the second set of pins and has placed them into groups based upon an established pattern such as a grid of cells. Further, operation 157 has created clusters of hotspot pins and this is also shown in FIG. 3B. In particular, FIG. 3B shows two clusters of hotspot pins, clusters 265 and 277. Moreover, two hotspot pins remain un-clustered (hotspot pins 254 and 261). The remainder of the pins, which are in the second set of pins, have been clustered based upon the pattern or grid of cells shown in FIG. 3B. Cluster 279 has two pins while clusters 267, 273 and 275 have four pins. Clusters 281, 283, 285, 269 and 289 have six pins each, while clusters 271, 291, and 287 have five pins each. Following operation 159, the simulation system can perform operation 161. In operation 161, the simulation system can perform a second parasitic analysis using the first set of pins, which include any clusters of pins in the first set, and clusters of pins in the second set of pins. This second parasitic analysis in operation 161 can employ conventional techniques known in the art, such as the method shown in FIG. 2C, to extract the data about the parasitic values of the pins in the circuit design of the IC package and associated PCB. In one embodiment, operation 161 can export a SPICE model with the group information, such as the information that designates the first set of clusters and the second set of clusters, for a system-level simulation and analysis. Further information about operation 161 is provided in conjunction with a description of FIG. 2C. The method shown in FIG. 2B can conclude by displaying the groups, such as hotspots and uniform regions, and other parasitic data superimposed upon the circuit design. In one embodiment, this display of the groups can resemble the image shown in FIG. 3B of the IC package 251.

FIG. 2C shows an example of a method (known in the art) performed by a simulation system for computing or extracting parasitic values from a circuit design, such as the circuit design of an IC package, after obtaining a reduced model from either the method shown in FIG. 2A or the method shown in FIG. 2B. Operation 201 in FIG. 2C can receive the outputs (a reduced model) from operations 105, 107, & 109 (in the case of the method shown in FIG. 2A) or the outputs (another reduced model) from operations 155, 157, & 159 (in the case of the method shown in FIG. 2B), and then use those outputs to perform a DC and/or AC parasitic extraction of the design using the reduced model (such as the first set of clusters and the second set of clusters which are referred to as "smart pin groups" in operation 201 in FIG. 2C). The extracted parasitic values and the smart pin groups information can be exported to a SPICE model for a system-level co-simulation and analysis. As shown in operation 203, the simulation system can use known meshing algorithms to forms meshes of each metal shape of the conductors in the design to create a mesh of the circuit traces (conductors) in the circuit design and can use finite element methods for solving the Laplace equation to obtain DC resistance and can post process currents through the traces to get DC inductance. As shown in operation 205, the simulation system can perform AC resistance and inductance extraction based upon quasi-static or full wave approaches that are known in the art using either finite element methods (FEM) or method of moments (MoM). In one embodiment, all conducting objects are meshed using a surface or volumetric mesh, and excitations are applied at each of the pin groups and a matrix system is then solved to obtain AC resistance and inductance. As shown in operation 207, the simulation system can perform AC capacitance extraction by solving either a differential or integral form of Maxwell's equation. In one embodiment, each conducting body can have a voltage, such as 1 V, applied to the body and the induced charges on all of the conductors are computed and can then be post processed to obtain the capacitances between all of the conductors. Then in operation 209, a SPICE model can be synthesized based on the DC resistance and inductance and also based on the AC resistance and inductance and based on capacitance matrices in a standard format. The SPICE model can then be used for system-level simulation and analysis, including simulation that takes into account both the IC package and the integrated circuit itself as well as the PCB that is coupled to the IC package. The outputs from these simulations can be displayed to the designers of the IC package and the IC to allow them to change the design if the results are not satisfactory.

Figure 4:
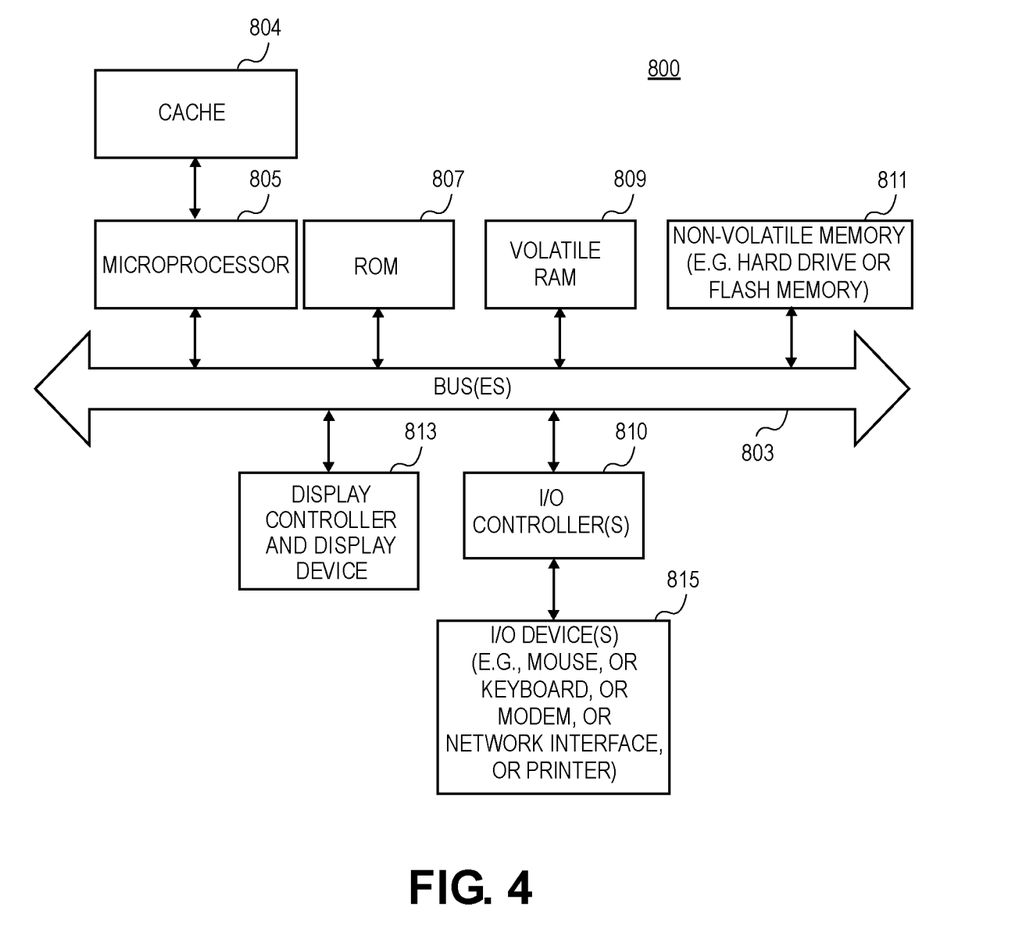
FIG. 4 shows an example of a data processing system that can perform the one or more methods described herein.

FIG. 4 shows one example of a data processing system 800, which may be used with one or more embodiments described herein. For example, the system 800 may be implemented to provide a simulation system or device that performs the methods described herein such as the methods shown in FIG. 1 or 2A or 2B or 2C. Note that while FIG. 4 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 4, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 4 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a non-transitory computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine-readable medium includes any mechanism for storing information in a form readable by a machine (e.g., a computer). For example, a non-transitory machine-readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more non-transitory memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)) and then stored in non-transitory memory (e.g., DRAM or flash memory or both) in the client computer.

The preceding detailed descriptions are presented in terms of algorithms and symbolic representations of operations on data bits within a device memory. These algorithmic descriptions and representations are the tools used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine-readable medium storing executable instructions which when executed by a data processing system cause the data processing system to perform a method, the method comprising:
    performing a first parasitic analysis of a circuit design of a printed circuit board (PCB) coupled to an IC package to provide first extracted data about parasitic values of each pin in a set of pins on the PCB and IC package;
    determining, from the first extracted data, a first set of pins that have parasitic values that exceed a first parasitic value and determining a second set of pins that have parasitic values that do not exceed the first parasitic value;
    determining whether at least some pins in the first set of pins can be clustered;
    creating, in response to determining at least some pins in the first set of pins can be clustered, a first set of one or more clusters of pins, each cluster in the first set of one or more clusters having a plurality of pins from the first set of pins;
    creating a second set of one or more clusters of pins from the second set of pins; and
    performing a second parasitic analysis on the first set of pins and the second set of one or more clusters.

2. The non-transitory machine-readable medium as in claim 1, wherein the first parasitic analysis comprises at least one of (a) a first finite element method (FEM) analysis of the circuit design or (b) a first method of moments (MoM) analysis of the circuit design to derive the first extracted data; and wherein the parasitic values are represented as one of: DC (direct current) resistance; or AC (alternating current) resistance and inductance; or IC (integrated circuit) pin level current; and wherein the second parasitic analysis comprises at least one of (a) a second FEM analysis of the first set of pins and the second set of one or more clusters or (b) a second MoM analysis of the first set of pins and the second set of one or more clusters.

3. The non-transitory machine-readable medium as in claim 1, wherein a first group of pins in the first set of pins are clustered into the first set of one or more clusters and a second group of one or more pins in the first set of pins are not clustered and are analyzed by the second parasitic analysis as an individual pins; and wherein for any set of pins that are clustered, the second parasitic analysis simulates a same excitation at a same voltage for each pin in the any set of pins.

4. The non-transitory machine-readable medium as in claim 1, wherein when creating the first set of one or more clusters of pins, a pin, in the first set of pins, is clustered with other pins based on one or more of: (1) being coupled to a same net of conductors as the other pins; (2) having a parasitic value within a same range of parasitic values of the other pins; or (3) physical proximity to the other pins.

5. The non-transitory machine-readable medium as in claim 4, wherein when creating the second set of one or more clusters of pins, a pin, in the second set of pins, is clustered with other pins, in the second set of pins, based on (1) being coupled to a same net of conductors as the other pins in the second set of pins; and (2) being located in a cell with the other pins in the second set of pins, the cell defined in a pattern of cells overlaid on the circuit design.

6. The non-transitory machine-readable medium as in claim 5, wherein the pattern is a grid and wherein the method further comprises:
    displaying the first set of one or more clusters of pins and the second set of one or more clusters of pins superimposed on a graphical representation of the circuit design.

7. The non-transitory machine-readable medium as in claim 5, wherein the method further comprises:
    receiving a selection of a criteria used to determine the first set of pins, wherein the criteria comprises one of: DC resistance; AC resistance and inductance; or IC pin level current parasitics; and
    wherein the same range is defined by a second threshold value and a third threshold value.

8. The non-transitory machine-readable medium as in claim 7, wherein the method further comprises:
calculating a statistical value from the first extracted data;
adding a first threshold value to the statistical value to derive the first parasitic value;
comparing a parasitic value for each pin in the set of pins on the PCB and IC package to the first parasitic value to determine the first set of pins.

9. The non-transitory machine-readable medium as in claim 8, wherein the method further comprises:
adjusting, after the comparing, the first parasitic value to reduce a number of pins in the first set of pins;
and wherein the comparing comprises a sorting operating that sorts the parasitic values for all pins in the set of pins on the PCB and IC package.

10. The non-transitory machine-readable medium as in claim 1 wherein the first parasitic analysis includes use of previously computed parasitic analysis for parasitics within one or more ICs in the IC package.

11. A machine implemented method performed by a data processing system, the method comprising:
performing a first parasitic analysis of a circuit design of a printed circuit board (PCB) coupled to an IC package to provide first extracted data about parasitic values of each pin in a set of pins on the PCB and IC package;
determining, from the first extracted data, a first set of pins that have parasitic values that exceed a first parasitic value and determining a second set of pins that have parasitic values that do not exceed the first parasitic value;
determining whether at least some pins in the first set of pins can be clustered;
creating, in response to determining at least some pins in the first set of pins can be clustered, a first set of one or more clusters of pins, each cluster in the first set of one or more clusters having a plurality of pins from the first set of pins;
creating a second set of one or more clusters of pins from the second set of pins; and
performing a second parasitic analysis on the first set of pins and the second set of one or more clusters.

12. The method as in claim 11, wherein the first parasitic analysis comprises at least one of (a) a first finite element method (FEM) analysis of the circuit design or (b) a first method of moments (MoM) analysis of the circuit design to derive the first extracted data; and wherein the parasitic values are represented as one of: DC (direct current) resistance; or AC (alternating current) resistance and inductance; or IC (integrated circuit) pin level current; and wherein the second parasitic analysis comprises at least one of (a) a second FEM analysis of the first set of pins and the second set of one or more clusters or (b) a second MoM analysis of the first set of pins and the second set of one or more clusters.

13. The method as in claim 11, wherein a first group of pins in the first set of pins are clustered into the first set of one or more clusters and a second group of one or more pins in the first set of pins are not clustered and are analyzed by the second parasitic analysis as an individual pins; and wherein for any set of pins that are clustered, the second parasitic analysis simulates a same excitation at a same voltage for each pin in the any set of pins.

14. The method as in claim 11, wherein when creating the first set of one or more clusters of pins, a pin, in the first set of pins, is clustered with other pins based on one or more of: (1) being coupled to a same net of conductors as the other pins; (2) having a parasitic value within a same range of parasitic values of the other pins; or (3) physical proximity to the other pins.

15. The method as in claim 14, wherein when creating the second set of one or more clusters of pins, a pin, in the second set of pins, is clustered with other pins, in the second set of pins, based on (1) being coupled to a same net of conductors as the other pins in the second set of pins; and (2) being located in a cell with the other pins in the second set of pins, the cell defined in a pattern of cells overlaid on the circuit design.

16. The method as in claim 15, wherein the pattern is a grid and wherein the method further comprises:
displaying the first set of one or more clusters of pins and the second set of one or more clusters of pins superimposed on a graphical representation of the circuit design.

17. The method as in claim 15, wherein the method further comprises:
receiving a selection of a criteria used to determine the first set of pins, wherein the criteria comprises one of: DC resistance; AC resistance and inductance; or IC pin level current parasitics; and
wherein the same range is defined by a second threshold value and a third threshold value.

18. The method as in claim 17, wherein the method further comprises:
calculating a statistical value from the first extracted data;
adding a first threshold value to the statistical value to derive the first parasitic value;
comparing a parasitic value for each pin in the set of pins on the PCB and IC package to the first parasitic value to determine the first set of pins.

19. The method as in claim 18, wherein the method further comprises:
adjusting, after the comparing, the first parasitic value to reduce a number of pins in the first set of pins;
and wherein the comparing comprises a sorting operating that sorts the parasitic values for all pins in the set of pins on the PCB and IC package.

20. The method as in claim 11 wherein the first parasitic analysis includes use of previously computed parasitic analysis for parasitics within one or more ICs in the IC package.

* * * * *